(12) United States Patent
Shen

(10) Patent No.: US 8,024,841 B2
(45) Date of Patent: Sep. 27, 2011

(54) HINGE

(75) Inventor: Wen-Bin Shen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 379 days.

(21) Appl. No.: 12/412,385

(22) Filed: Mar. 27, 2009

(65) Prior Publication Data
US 2010/0139034 A1    Jun. 10, 2010

(30) Foreign Application Priority Data

Dec. 10, 2008   (CN) ...................... 2008 2 0303298 U

(51) Int. Cl.
*E05C 17/64*      (2006.01)

(52) U.S. Cl. .............................. 16/341; 16/339; 16/342

(58) Field of Classification Search .................... 16/342, 16/341, 338, 339, 349, 2.1, 337; 361/679.27; 379/433.13; 455/575.3
See application file for complete search history.

(56) References Cited

U.S. PATENT DOCUMENTS

| | | | | |
|---|---|---|---|---|
| 1,847,937 | A * | 3/1932 | Fetters | 16/339 |
| 5,697,124 | A * | 12/1997 | Jung | 16/341 |
| 5,715,576 | A * | 2/1998 | Liu | 16/342 |
| 6,381,808 | B1 * | 5/2002 | Kida | 16/340 |
| 7,455,471 | B2 * | 11/2008 | Gawehn | 403/374.4 |
| 7,810,214 | B2 * | 10/2010 | Feng et al. | 16/348 |
| 7,936,559 | B2 * | 5/2011 | Chen | 361/679.27 |
| 2002/0112319 | A1 * | 8/2002 | Kida | 16/342 |

* cited by examiner

*Primary Examiner* — William L. Miller
(74) *Attorney, Agent, or Firm* — Altis Law Group, Inc.

(57) ABSTRACT

A hinge includes a bracket, a shaft rotatably received in the bracket, a engaging member, a pressing member, and a driving member. The bracket includes a casing portion defining a receiving space therein. The receiving space includes a circular part and a slot connecting the circular part. The engaging member is received in the slot of the bracket. The engaging member includes a slope surface and a screw hole. The pressing member is received in the slot of the bracket. The pressing member includes a pressing portion pressing firmly against the shaft, and a driven portion engaged with the slope surface of the engaging member. The driving member includes a screw pole capable of screwing in the screw hole of the engaging member to move the engaging member toward the pressing member, for driving the pressing member to press firmly against the shaft.

18 Claims, 4 Drawing Sheets

HINGE

BACKGROUND

1. Technical Field

The disclosure relates to mechanical structures and, particularly, to a hinge.

2. Description of Related Art

A foldable device, such as a notebook computer or a clamshell mobile phone, generally includes two parts pivotally connected via a hinge. The hinge generally includes a bracket mounted to one part and a shaft with a first end mounted to the other part. The bracket includes a barrel rotatably receiving a second end of the shaft. For keeping the one part of the foldable device at any angle with respect to the other part, a frictional force is provided between the bracket and the shaft. However, over time, the fit between the bracket and the shaft may loosen, which may cause unwanted noise and poor performance.

DETAILED DESCRIPTION

Figure 1:
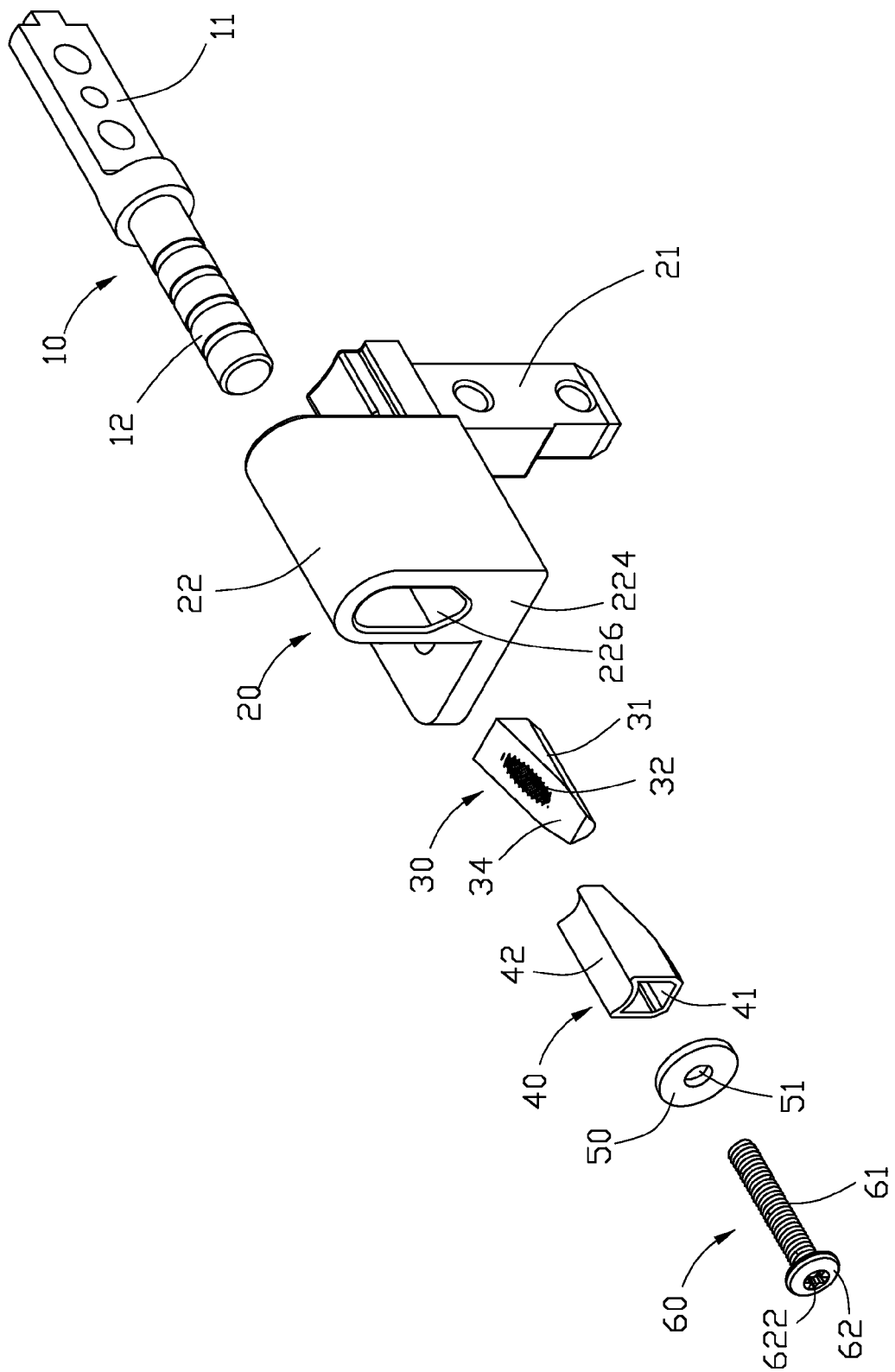
FIG. 1 is an exploded, isometric view of an exemplary embodiment of a hinge.
Figure 2:
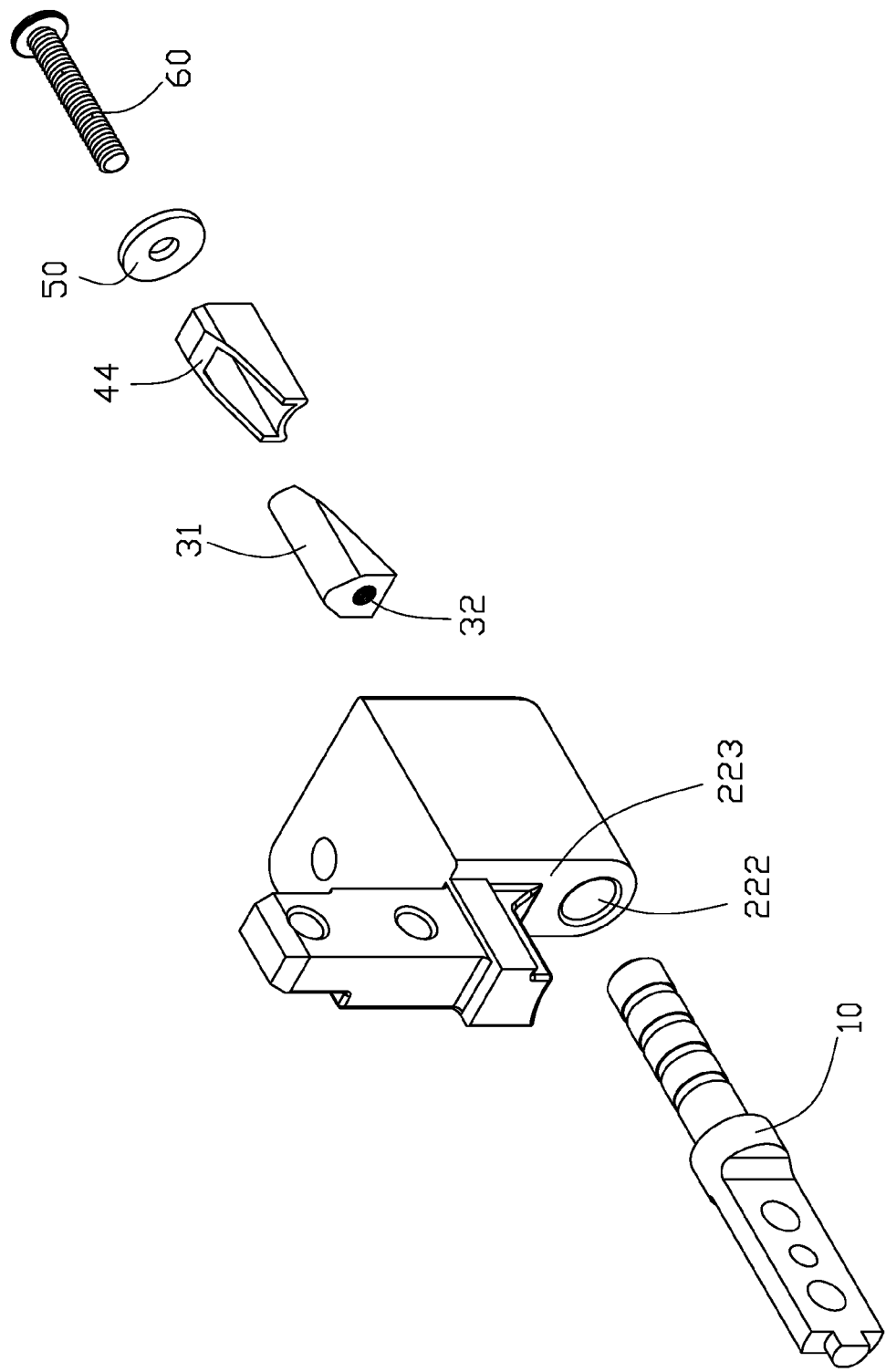
FIG. 2 is an inverted view of the hinge of FIG. 1.

Referring to FIGS. 1 and 2, an exemplary embodiment of a hinge is adapted to be mounted to a foldable device, such as a notebook computer or a clamshell mobile phone, that includes two parts rotatably connected to each other via the hinge. The hinge includes a shaft 10, a bracket 20, an engaging member 30, a pressing member 40, a washer 50, and a driving member 60. The shaft 10 is rotatable with respect to the bracket 20. The bracket 20 and the shaft 10 are capable of being respectively fixed to two parts of the foldable device.

The shaft 10 includes a fixing portion 11 at a first end of the shaft 10, a spindle 12 at a second end opposite to the first end of the shaft 10, and a block (not labeled) connected between the spindle 12 and the fixing portion 11. The spindle 12 is capable of being rotatably received in the bracket 20. The fixing portion 11 is generally flat, and defines a plurality of fixing holes, for allowing rivets or screws to extend therethrough, therefore fixing the shaft 10 to one part of the foldable device.

The bracket 20 includes a mounting portion 21 and a casing portion 22 extending vertically from an end of the mounting portion 21. In other embodiments, the casing portion 22 may be a separate part, and fixed to the mounting portion 21. The mounting portion 21 defines two fixing holes (not labeled) for allowing rivets or screws to extend therethrough, thereby fixing the mounting portion 21 to the other part of the foldable device. The casing portion 22 defines a receiving space (not labeled) therein. The receiving space includes a circular hole 222 in an upper part of the casing portion 22 and a V-shaped slot 226 under and communicating with the circular hole 222. The circular hole 222 extends through a first end 223 to a second end 224 of the casing portion 22, for rotationally receiving the spindle 12 of the shaft 10. The V-shaped slot 226 is defined in the second end 224 of the casing portion 22, extending along the axial direction of the circular hole 222.

The engaging member 30 includes a stand 31 configured at a bottom of the engaging member 30 and shaped to be fittingly received in the slot 226 of the bracket 20, and a slope surface 34 extending from a top of the stand 31. A screw hole 32 is defined in the engaging member 30 along the axial direction of the circular hole 222.

The pressing member 40 is generally a tube with a through hole 41 defined in a center. A concave-shaped pressing portion 42 shaped fitting for the spindle 12 is formed on a top of the pressing member 40. An inclined driven portion 44 is formed on a bottom of the pressing member 40.

The washer 50 is generally circular, with a through hole 51 defined in a center. An outer diameter of the washer 50 is greater than a size of the slot 226 of the bracket 20.

In this embodiment, the driving member 60 is a bolt, which includes a screw pole 61 and a head 62. An operating portion 622 is defined in the head 62 opposite to the screw pole 61. The operating portion 622 can be a cross recess of the bolt, for a screwdriver to conveniently operate. In an alternative embodiment, the operating portion 622 may be a handle fixed to the head 62.

Figure 3:
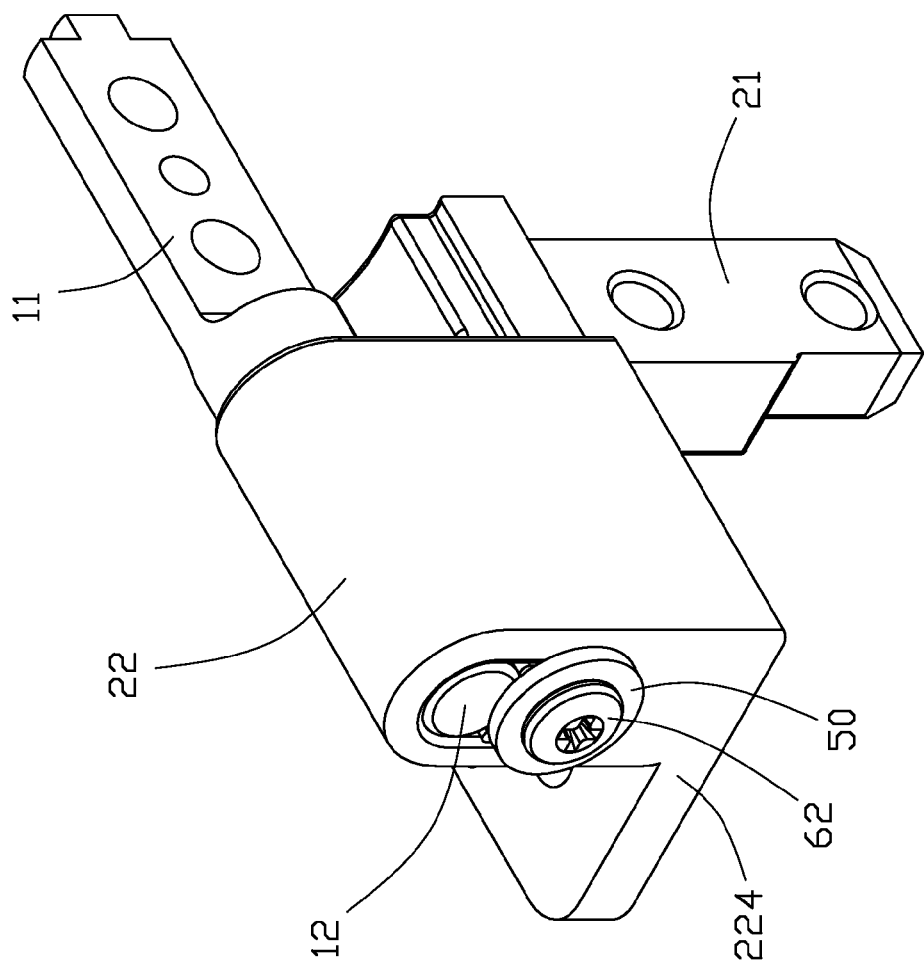
FIG. 3 is an assembled, isometric view of the hinge of FIG. 1.
Figure 4:
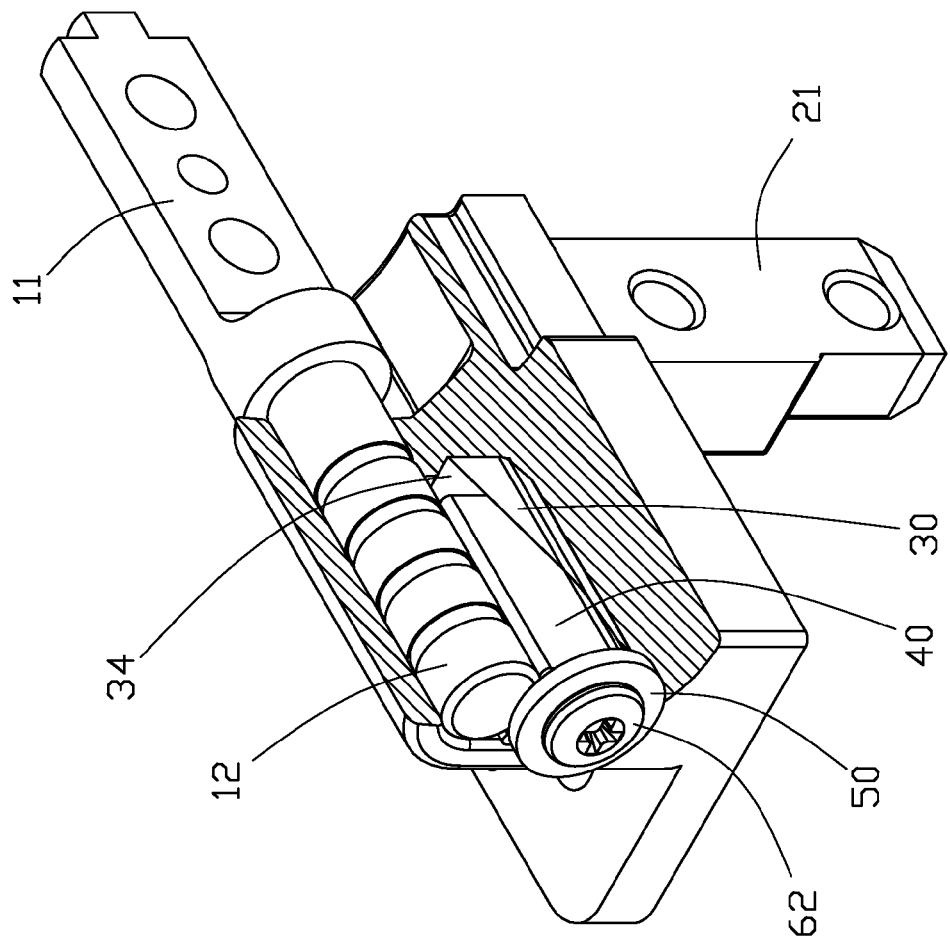
FIG. 4 is a partially cutaway view of the hinge of FIG. 3.

Referring to FIGS. 3 and 4, in assembly, the spindle 12 of the shaft 10 is inserted into the circular hole 222 of the bracket 20 from the first end 223 of the casing portion 22. The engaging member 30 and the pressing member 40 are inserted into the slot 226 of the casing portion 22 in order from the second end 224 of the casing portion 22. Therefore, the stand 31 of the engaging member 30 is tightly received in the V-shaped slot 226 of the bracket 20, and the slope surface 34 of the engaging member 30 is engaged with the driven portion 44 of the pressing member 40. The pressing portion 42 of the pressing member 40 supports the spindle 12 thereon. The driving member 60 extends through the through hole 51 of the washer 50 and the through hole 41 of the pressing member 40, to screw in the screw hole 32 of the engaging member 30. The washer 50 resists against the second end 224 of the bracket 20. After the mounting portion 21 of the bracket 20 and the fixing portion 11 of the shaft 10 are respectively fixed to the two parts of the foldable device, the two parts are rotatable with respect to each other.

In use, the spindle 12 is rotatable in the circular hole 222 of the bracket 20. The friction between the spindle 12 and the bracket 20 is used for positioning one part of the foldable device with respect to the other part of the foldable device at desired angles. Over time, when the fit between the bracket 20 and spindle 12 of the shaft 10 is loosened, the operating portion 622 of the driving member 60 is operated to rotate the driving member 60. Therefore, the screw pole 61 of the driving member 60 is further screwed into the screw hole 32 of the engaging member 30 to move the engaging member 30 toward the pressing member 40. The slope surface 34 of the engaging member 30 drives the driven portion 44 of the pressing member 40, to drive the pressing member 40 to firmly resist against the spindle 12 of the shaft 10 for adding friction between the bracket 20 and the spindle 12 of the shaft 10.

Obviously, if a diameter of the head 62 of the driving member 60 is greater than that the size of the slot 226 of the bracket 20, the washer 50 may be omitted because of the same performing effect to the head 62.

While several embodiments have been disclosed, it is understood that any element disclosed in any one embodiment is easily adapted to other embodiments. It is also to be understood, however, that even though numerous characteristics and advantages of the disclosure have been set forth in the foregoing description, together with details of the structure and function of the invention, the disclosure is illustrative only, and changes may be made in details, especially in matters of shape, size, and arrangement of parts within the principles of the invention to the full extent indicated by the broad general meaning of the terms in which the appended claims are expressed.

What is claimed is:

1. A hinge, comprising:
   a bracket comprising a casing portion defining a circular hole having an axial direction, and a slot communicating with the circular hole and extending along the axial direction of the circular hole;
   a shaft rotatably received in the circular hole of the bracket;
   an engaging member received in the slot of the bracket, the engaging member comprising a slope surface facing the circular hole, and defining a screw hole in the slope surface;
   a pressing member received in the slot of the bracket between the engaging member and the shaft, the pressing member comprising a pressing portion firmly resisting against the shaft, and a driven portion engaged with the slope surface of the engaging member; and
   a driving member comprising a screw pole rotatably passing through the pressing member and screwed in the screw hole of the engaging member, to move the engaging member toward the pressing member, for driving the pressing member to further firmly resist against the shaft for adding friction between the bracket and the shaft.

2. The hinge of claim 1, wherein the circular hole extends through a first end to a second end of the casing portion.

3. The hinge of claim 2, wherein the slot is defined in the second end of the casing portion, and is generally V-shaped.

4. The hinge of claim 3, wherein the engaging member comprises a stand shaped to be fittingly received in the slot of the bracket.

5. The hinge of claim 4, wherein the slope surface is opposite to the stand.

6. The hinge of claim 1, wherein the screw hole is defined in the engaging member along the axial direction of the circular hole.

7. The hinge of claim 1, wherein the pressing member is generally tube-shaped, with a through hole defined in a center for the screw pole of the driving member passing therethrough.

8. The hinge of claim 7, wherein the pressing portion is concave-shaped to mate with the shaft.

9. The hinge of claim 8, wherein the driven portion is formed on the pressing member opposite to the pressing portion.

10. The hinge of claim 1, wherein the driving member is a bolt.

11. The hinge of claim 10, wherein the driving member further comprises a head for engaging with the bracket.

12. The hinge of claim 11, wherein an operating portion is defined in the head opposite to the screw pole, for conveniently operating the driving member.

13. The hinge of claim 12, wherein the operating portion is a cross recess of the bolt, for a screwdriver to operate.

14. The hinge of claim 1, further comprising a washer located between the driving member and the pressing member, for resisting against the bracket.

15. The hinge of claim 14, wherein an outer diameter of the washer is greater than an opening size of the slot of the bracket.

16. A hinge, comprising:
   a bracket comprising a casing portion, wherein the casing portion defines a through hole having an axial direction, and a slot communicating with the through hole and extending along the axial direction of the through hole;
   a shaft rotatably received in the through hole of the bracket;
   a first member received in the slot of the bracket, wherein the first member comprises an inclined surface facing the through hole;
   a second member received in the slot of the bracket and between the shaft and the inclined surface of the first member, to support the shaft and resist against the inclined surface of the first member; and
   a driving member comprising a first end, and a second end passing through the second member to movably engage with the first member, wherein the second end of the driving member is movable in the first member to shorten a length of the driving member between the first end of the driving member and the first member, to drive the second member to slide on the inclined surface of the first member, thereby driving the second member to move toward the shaft to firmly resist the shaft against a sidewall bounding the through hole of the bracket.

17. The hinge of claim 16, further comprising a washer fitting about the driving member, wherein the washer is located between the first end of the driving member and the bracket, to maintain the first and second members in the slot of the bracket.

18. The hinge of claim 16, wherein the second member comprises an inclined driven portion opposite to the shaft, to engage with and resist against the inclined surface of the first member.

* * * * *